United States Patent [19]

Avramova et al.

[11] Patent Number: 4,902,369

[45] Date of Patent: Feb. 20, 1990

[54] METHOD FOR THE PROCESSING OF LIQUID CRYSTAL POLYMERS

[75] Inventors: Nadka V. Avramova; Stoyko C. Fakirov, both of Sofia, Bulgaria

[73] Assignee: University of Delaware, Newark, Del.

[21] Appl. No.: 210,260

[22] Filed: Jun. 23, 1988

[30] Foreign Application Priority Data

Sep. 29, 1987 [BG] Bulgaria ............................. 81313

[51] Int. Cl.$^4$ .................. B32B 31/20; B32B 31/04; B32B 31/12; C09K 19/38
[52] U.S. Cl. .................... 156/308.2; 428/1; 428/474.4; 156/309.9; 156/311
[58] Field of Search .......................... 428/1, 474.7; 156/308.2, 309.9, 311

[56] References Cited

U.S. PATENT DOCUMENTS

| | | | |
|---|---|---|---|
| 4,332,759 | 6/1982 | Ide | 428/2 X |
| 4,384,016 | 5/1983 | Ide et al. | 428/1 |
| 4,388,139 | 6/1983 | Fuller | 428/1 X |

OTHER PUBLICATIONS

Ciferri and Ward, Eds. Ultra-High Modulus Polymers, pp. 227–231, Applied Science Publishers, London (1979).

Jackson and Kuhfuss, J. Polym. Sci., Polym. Chem. Ed., 14, 2043 (1976).

*Primary Examiner*—George F. Lesmes
*Assistant Examiner*—Elizabeth M. Cole
*Attorney, Agent, or Firm*—James H. Ryan

[57] ABSTRACT

Described and claimed are a process for preserving the orientation of a liquid crystal polymer/during lamination which comprises carrying out the lamination bonding at a high temperature below the melting point of the polymer and under pressure of up to about 5 MPa.

4 Claims, No Drawings

METHOD FOR THE PROCESSING OF LIQUID CRYSTAL POLYMERS

RIGHTS OF THE U.S. GOVERNMENT

The government of the United States of America has certain rights to this invention pursuant to National Science Foundation Grant No. INT 8520639.

PRIORITY

Priority is claimed of Bulgarian Authorship Certificate (Patent) application filed under Ser. No. 81313 for "Method for the Processing of Liquid Crystal Polymers" on Sept. 29, 1987, in Sofia, Bulgaria.

BACKGROUND OF THE INVENTION

1. Field of the Invention

The invention relates to a method for the processing of liquid crystal polymers by which their orientation and hence their good mechanical properties are preserved.

2. Prior Art

It is known that some polymers containing long and rigid molecules can form a liquid crystal phase. The liquid crystals melts are oriented during injection-molding and the resulting molecular orientation in the molten state is frozen after cooling. This orientation reinforces the material, increasing its elasticity modulus (Ultra-High Modulus Polymers, A. Ciferri and I. W. Ward, Eds., Appl. Sci. Pub., London (1979)). The molecular orientation of liquid crystal polymers depends strongly on the thickness of the article, the thinner the article, the higher the degree of orientation of the polymer molecules is. This high degree of orientation provides for good mechanical properties, e.g., elasticity modulus, tensile strength, etc. The elasticity modulus also drops abruptly with the rise of the article's thickness. The two-fold increase of the thickness leads to a multiple decrease in elasticity since an exponential dependence exists between these two parameters (W. J. Jackson, Jr., and H. F. Kuhfuss, J. Polym. Sci., Polym. Chem. Ed., 14, 2043 (1986)). Briefly, the rise of the thickness of the article leads to a loss of the unique mechanical properties of the liquid crystal polymers.

DESCRIPTION OF THE INVENTION

The object of the invention is to provide a method for the processing of liquid crystal polymers in which their high mechanical parameters are preserved regardless of the article's thickness.

The invention is based on the preparation of thin (15 - 200 microns) foils or films of a liquid crystal polymer, characterized by a high degree of orientation and high strength and elasticity modulus. Thicker articles can be obtained on the basis of these foils by lamination (longitudinal (parallel) or angular (crossplied). The bonding of the layers in the laminate is carried out by heating in vacuum or in an inert medium at a high temperature where the molecules are somewhat mobile but which is however below the melting point of the respective liquid crystal polymer, and pressing for 3 to 10 hours. This technique is applicable to polymers capable of undergoing exchange trans-reactions in the solid state, i.e., chemical healing since the occurrence of physical healing (based on diffusion) is hardly probable for such rigid liquid crystal molecules due to their low mobility. As a result of this treatment of the foils, an article of the desired thickness can be obtained by preserving a high degree of orientation in the entire volume and excellent mechanical properties as well.

Bonding can be realized also by the application of suitable adhesives or other bonding chemicals.

The advantages of the method of the invention are as follows: the high mechanical parameters of the thin foils with frozen high orientation of the liquid crystal molecules are preserved. The method does not require a considerable energy consumption (heating is carried out below the melting point of the polymer). When the adhesive compositions are applied, they do not differ from those used currently. The method can be carried out on the existing equipment for lamination and its duration meets the requirements for industrial applications.

EXAMPLE

Foils 200 microns thick are prepared from a liquid crystal copolymer of poly(ethyleneterephthalate) with 60 mole-% p-hydroxybenzoic acid (Eastman Kodak Co., USA) by extrusion through a flat die ("schlitz" extruder head) and immediate cooling down to 0° C. (ice water) in order to obtain frozen liquid crystal structure. A laminate, 1 mm thick, is prepared from these foils by heating to 170°–190° C. under pressure of about 3 MPa in vacuum where a preliminary "rinsing" with nitrogen was carried out so that no air is present in the residual atmosphere. Lamination is conducted for 10 hours. The laminate thus obtained has a tensile modulus of 89,600 kg/cm$^2$.

Having described our invention,

We claim:

1. The process of laminating liquid crystal polymer films having a high degree of molecular orientation as formed while maintaining the molecular orientation which comprises:
    cooling the films as formed to a temperature of around 0° C., and thereby freezing the molecular orientation, and
    contacting a multiplicity of said films at a temperature of at least 100° C. but below the melting point of the polymer and at a pressure of about 0.05–5 MPa for about 3–10 hours.

2. The process of claim 1 wherein the films are cooled in ice water.

3. The process of claim 1 wherein the liquid crystal polymer is a copolymer of poly(ethylenepterephthalate) and a hydroxybenzoic acid.

4. The process of claim 3 wherein the liquid crystal polymer is 60 mole-% p-hydroxybenzoic acid.

* * * * *